（12）United States Patent
Sadek et al.

(10) Patent No.: US 9,750,014 B2
(45) Date of Patent: Aug. 29, 2017

(54) INTERLACED CARRIER SENSE ADAPTIVE TRANSMISSION (CSAT) CO-EXISTENCE IN SHARED SPECTRUM

(71) Applicant: QUALCOMM Incorporated, San Diego, CA (US)

(72) Inventors: Ahmed Kamel Sadek, San Diego, CA (US); Akula Aneesh Reddy, San Diego, CA (US); Nachiappan Valliappan, San Diego, CA (US); Ping Xia, San Diego, CA (US); Mohammad Naghshvar, San Diego, CA (US); Tamer Adel Kadous, San Diego, CA (US); Mingxi Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/692,224

(22) Filed: Apr. 21, 2015

(65) Prior Publication Data
US 2015/0305030 A1    Oct. 22, 2015

Related U.S. Application Data

(60) Provisional application No. 61/982,779, filed on Apr. 22, 2014.

(51) Int. Cl.
*H04W 72/04* (2009.01)
*H04W 16/14* (2009.01)

(52) U.S. Cl.
CPC ....... *H04W 72/0446* (2013.01); *H04W 16/14* (2013.01)

(58) Field of Classification Search
CPC .. H04W 72/0446; H04W 16/14; H04W 88/06
See application file for complete search history.

(56) References Cited

U.S. PATENT DOCUMENTS

| 2007/0223419 | A1 | 9/2007 | Ji et al. | |
| 2012/0188907 | A1* | 7/2012 | Dayal | H04W 72/1215 370/254 |
| 2012/0327869 | A1* | 12/2012 | Wang | H04W 72/1215 370/329 |
| 2013/0201884 | A1* | 8/2013 | Freda | H04W 72/005 370/278 |

(Continued)

*Primary Examiner* — Pao Sinkantarakorn
*Assistant Examiner* — Kabir Jahangir
(74) *Attorney, Agent, or Firm* — Muncy, Geissler, Olds & Lowe, P.C.

(57) ABSTRACT

Techniques for managing operation over a communication medium shared between Radio Access Technologies (RATs) are disclosed. In one example, one or more parameters of a Time Division Multiplexing (TDM) communication pattern may be set to define activated periods and deactivated periods for communication over the medium. A first interlace may be selected among a plurality of interlaces for communication over the medium, the first interlace being reserved for a first operator. During the first interlace, transmission over the medium may be cycled in accordance with the TDM communication pattern, and deactivated during a second interlace among the plurality of interlaces that is reserved for a second operator.

20 Claims, 9 Drawing Sheets

(56) References Cited

U.S. PATENT DOCUMENTS

| | | | |
|---|---|---|---|
| 2013/0208587 A1* | 8/2013 | Bala | H04W 16/14 370/230 |
| 2013/0294356 A1 | 11/2013 | Bala et al. | |
| 2013/0295948 A1 | 11/2013 | Ye et al. | |
| 2015/0018002 A1 | 1/2015 | Touag et al. | |
| 2015/0063150 A1* | 3/2015 | Sadek | H04W 24/10 370/252 |
| 2015/0163825 A1* | 6/2015 | Sadek | H04W 74/0808 370/329 |

* cited by examiner

INTERLACED CARRIER SENSE ADAPTIVE TRANSMISSION (CSAT) CO-EXISTENCE IN SHARED SPECTRUM

CROSS-REFERENCE TO RELATED APPLICATIONS

The present Application for Patent claims the benefit of U.S. Provisional Application No. 61/982,779, entitled "INTERLACED CARRIER SENSE ADAPTIVE TRANSMISSION (CSAT) CO-EXISTENCE IN UNLICENSED SPECTRUM," filed Apr. 22, 2014, assigned to the assignee hereof, and expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for co-existence between wireless Radio Access Technologies (RATs) and related operations in shared spectrum are disclosed.

In one example, an apparatus for managing operation on a communication medium shared between RATs is disclosed. The apparatus may include, for example, first and second transceivers, a medium utilization analyzer, an operating mode controller, and an interlace selector. The first transceiver may be configured to operate in accordance with a first RAT and to monitor the medium for first RAT signaling. The medium utilization analyzer may be configured to determine a utilization metric associated with utilization of the medium by the first RAT signaling. The operating mode controller may be configured to set one or more parameters of a Time Division Multiplexing (TDM) communication pattern based on the utilization metric, with the TDM communication pattern defining activated periods and deactivated periods for communication over the medium in accordance with a second RAT. The interlace selector may be configured to select a first interlace among a plurality of interlaces for communication over the medium in accordance with the second RAT, with the first interlace being reserved for a first operator of the second RAT. The second transceiver may be configured to operate in accordance with the second RAT and to cycle, during the first interlace, second RAT transmission over the medium in accordance with the TDM communication pattern, and to deactivate second RAT transmission over the medium during a second interlace among the plurality of interlaces that is reserved for a second operator of the second RAT.

In another example, a method for managing operation on a communication medium shared between RATs is disclosed. The method may include, for example, monitoring the medium, via a first transceiver configured to operate in accordance with a first RAT, for first RAT signaling; determining a utilization metric associated with utilization of the medium by the first RAT signaling; setting one or more parameters of a TDM communication pattern based on the utilization metric, the TDM communication pattern defining activated periods and deactivated periods for communication over the medium in accordance with a second RAT; selecting a first interlace among a plurality of interlaces for communication over the medium in accordance with the second RAT, the first interlace being reserved for a first operator of the second RAT; cycling, via a second transceiver configured to operate in accordance with the second RAT and during the first interlace, second RAT transmission over the medium in accordance with the TDM communication pattern; and deactivating second RAT transmission via the second transceiver over the medium during a second interlace among the plurality of interlaces that is reserved for a second operator of the second RAT.

In another example, another apparatus for managing operation on a communication medium shared between RATs is disclosed. The apparatus may include, for example, means for monitoring the medium, in accordance with a first RAT, for first RAT signaling; means for determining a utilization metric associated with utilization of the medium by the first RAT signaling; means for setting one or more parameters of a Time Division Multiplexing (TDM) communication pattern based on the utilization metric, the TDM communication pattern defining activated periods and deactivated periods for communication over the medium in accordance with a second RAT; means for selecting a first interlace among a plurality of interlaces for communication over the medium in accordance with the second RAT, the first interlace being reserved for a first operator of the second RAT; means for cycling, via a second transceiver configured to operate in accordance with the second RAT and during the first interlace, second RAT transmission over the medium in accordance with the TDM communication pattern; and means for deactivating second RAT transmission in accordance with the second RAT over the medium during a second interlace among the plurality of interlaces that is reserved for a second operator of the second RAT.

In another example, a transitory or non-transitory computer-readable medium including code, which, when executed by a processor, causes the processor to perform operations for managing operation on a communication medium shared between RATs is disclosed. The computer-readable medium may include, for example, code for monitoring the medium, in accordance with a first RAT, for first RAT signaling; code for determining a utilization metric associated with utilization of the medium by the first RAT signaling; code for setting one or more parameters of a Time Division Multiplexing (TDM) communication pattern based on the utilization metric, the TDM communication pattern defining activated periods and deactivated periods for communication over the medium in accordance with a second RAT; code for selecting a first interlace among a plurality of interlaces for communication over the medium in accordance with the second RAT, the first interlace being reserved for a first operator of the second RAT; code for cycling, via a second transceiver configured to operate in accordance with the second RAT and during the first interlace, second RAT transmission over the medium in accordance with the TDM communication pattern; and code for deactivating second RAT transmission in accordance with the second RAT over the medium during a second interlace among the plurality of interlaces that is reserved for a second operator of the second RAT.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to an interlacing structure for an example long-term Time Division Multi-plexed (TDM) communication scheme referred to herein as Carrier Sense Adaptive Transmission (CSAT). A CSAT communication scheme may define a series of activated and deactivated periods of operation on a given communication medium. Coordination among access points implementing CSAT on different operators may facilitated by the interlacing structure may help to facilitate not only better co-existence with other Radio Access Technologies (e.g., Wi-Fi), for example, but also co-existence among the different operators themselves. The particular interlaces that a given operator may select or otherwise identify for use may be determined in a number of ways. For example, the operators may select alternating interlaces in accordance with an operator ordering, which may be individually inferred and then globally converged upon based on certain medium scanning measurements. As another example, individual interlaces may be scanned to identify viable options and a transmission pattern may be constructed therefrom. As another example, the ordering may be based on common control channel information advertised between neighboring operator access points.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
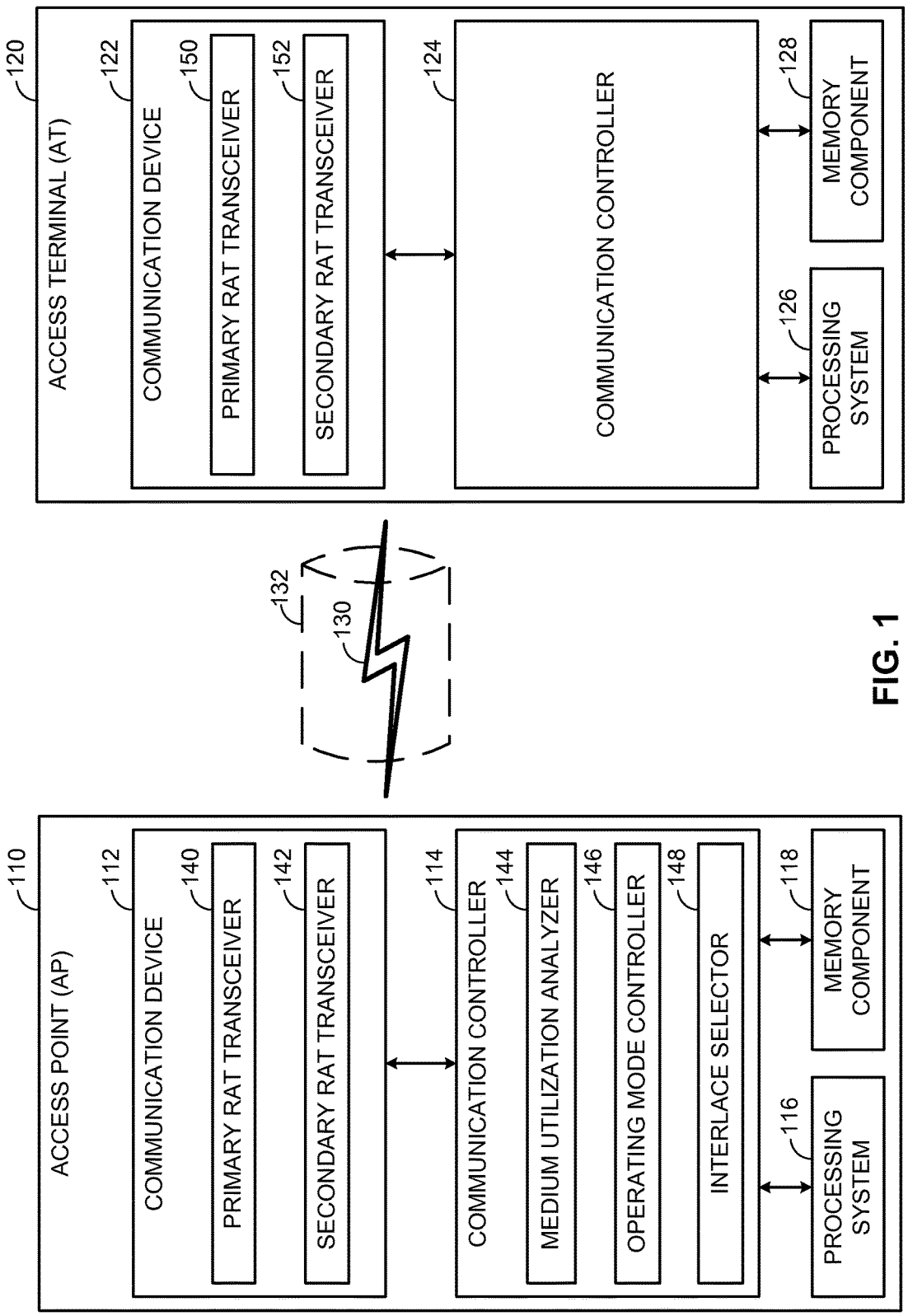
FIG. 1 illustrates an example wireless communication system including an Access Point (AP) in communication with an Access Terminal (AT).

FIG. 1 illustrates an example wireless communication system including an Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (JOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As a particular example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a primary RAT transceiver 140 configured to operate in accordance with one RAT and a secondary RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Long Term Evolution (LTE) technology to provide communication with the access terminal 120 on the wireless link 130, while the secondary RAT transceiver 142 may operate in accordance with Wi-Fi technology to monitor Wi-Fi signaling on the medium 132 that may interfere with or be interfered with by the LTE communications. The secondary RAT transceiver 142 may or may not serve as a full Wi-Fi AP providing communication services to a corresponding Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

As will be discussed in more detail below with reference to FIGS. 2-7, the communication controller 114 of the access point 110 may include a medium utilization analyzer 144, an operating mode controller 146, and an interlace selector 148, which may operate in conjunction with the primary RAT transceiver 140 and/or the secondary RAT transceiver 142 to manage operation on the medium 132. In addition or as an alternative, in some designs, the communication controller 124 of the access terminal 120 may include similar or complimentary components (not shown), although this is not required.

Figure 2:
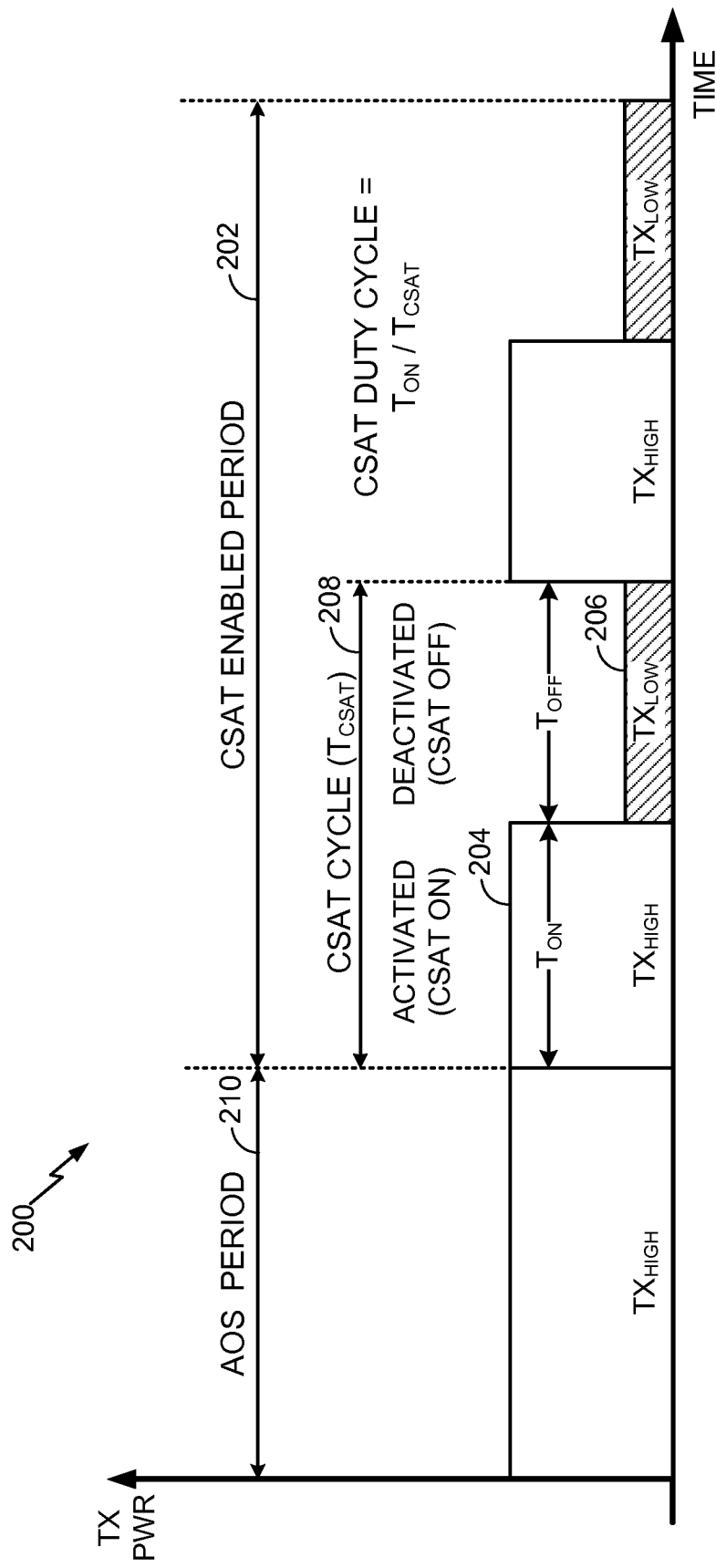
FIG. 2 illustrates certain aspects of an example long-term Time Division Multiplexed (TDM) communication scheme referred to herein as Carrier Sense Adaptive Transmission (CSAT).

FIG. 2 illustrates certain aspects of an example long-term Time Division Multiplexed (TDM) communication scheme referred to herein as Carrier Sense Adaptive Transmission (CSAT) that may be implemented on the medium 132. A CSAT communication scheme may be used to foster co-existence between (i) primary RAT communications between the access point 110 and access terminal 120 and (ii) other, secondary RAT communications between neighboring devices, for example, by cycling operation of the primary RAT over the medium 132 (e.g., on a corresponding Secondary Cell (SCell) provided by the access point 110 on the unlicensed band) in accordance with a TDM communication pattern 200. A CSAT communication scheme as provided herein may offer several advantages for mixed-RAT co-existence environments.

As shown, during a CSAT enabled period 202, operation of the primary RAT may be cycled over time between activated (CSAT ON) periods 204 and deactivated (CSAT OFF) periods 206. A given activated period 204/deactivated period 206 pair may constitute a CSAT cycle ($T_{CSAT}$) 208. During a period of time $T_{ON}$ associated with each activated period 204, primary RAT transmission on the medium 132 may proceed at a normal, relatively high transmission power. During a period of time $T_{OFF}$ associated with each deactivated period 206, however, primary RAT transmission on the medium 132 is reduced or even fully disabled to yield the medium 132 to neighboring devices operating according to the secondary RAT. Further, the cycling between activated periods 204 and deactivated periods 206 may be periodically disabled to provide an Always On State (AOS) period 210 of activated communication. In general, the AOS period 210 may be longer than an individual activated period 204 and thereby provide a supplemental opportunity for various measurements, including both intra-frequency measurements and inter-frequency measurements.

Each of the associated CSAT parameters, including, for example, a duty cycle (i.e., $T_{ON}/T_{CSAT}$) and the respective transmission powers during activated periods 204 and deactivated periods 206, may be adapted based on the current signaling conditions on the medium 132 to dynamically optimize the CSAT communication scheme. For example, the secondary RAT transceiver 142 configured to operate in accordance with the secondary RAT (e.g., Wi-Fi) may be further configured to monitor the medium 132 for secondary RAT signaling, which may interfere with or be interfered with by primary RAT communications over the medium 132. The medium utilization analyzer 144 may be configured to determine a utilization metric associated with utilization of the medium 132 by the secondary RAT signaling. Based on the utilization metric, the operating mode controller 146 may be configured to set the associated parameters and the primary RAT transceiver 140 configured to operate in accordance with the primary RAT (e.g., LTE) may be further configured to cycle between activated periods 204 of communication and deactivated periods 206 of communication over the medium 132 in accordance therewith. As an example, if the utilization metric is high (e.g., above a threshold), one or more of the parameters may be adjusted such that usage of the medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the medium 132 by the primary RAT transceiver 140 is increased (e.g., via an increase in the duty cycle or transmission power).

As a further enhancement, the access point 110 may coordinate with other access points implementing CSAT on different operators via a CSAT interlacing structure. In general, the different operators may correspond to respective entities that manage respective networks, with each network being composed of multiple access points. This coordination may help to facilitate not only better co-existence with other RATs as described above, but also co-existence among the different primary RAT operators themselves.

Figure 3:
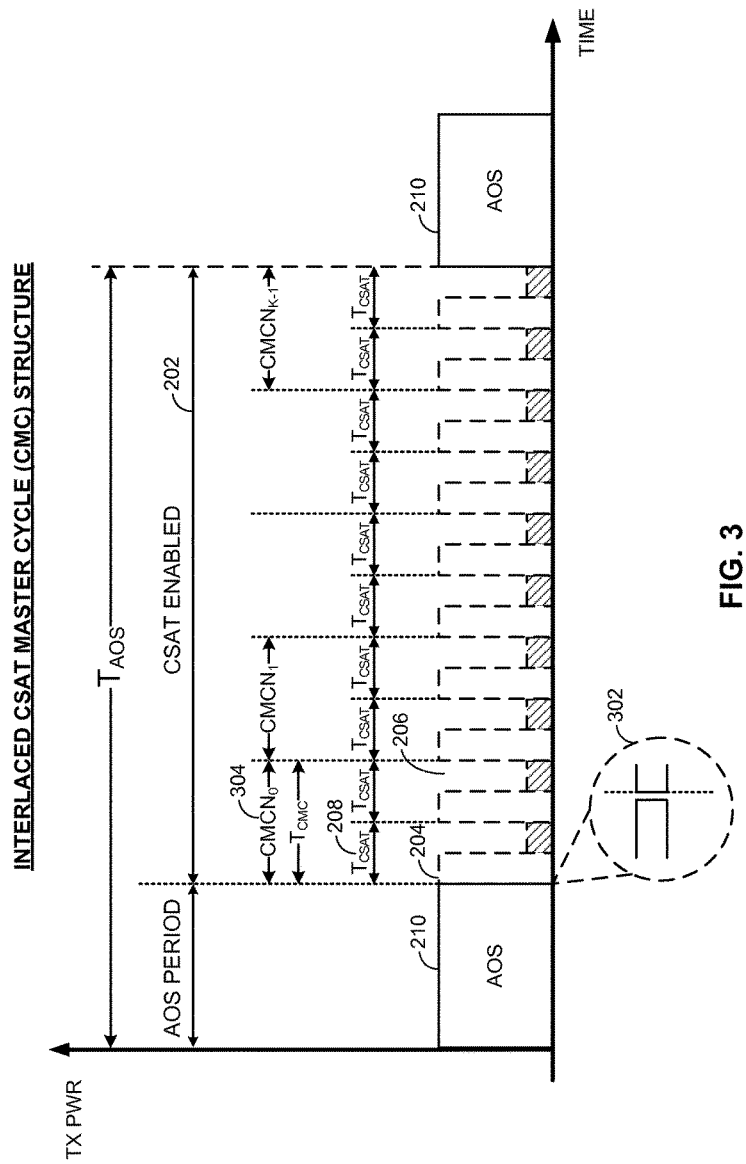
FIG. 3 illustrates an example CSAT interlacing structure to facilitate inter-operator coordination and co-existence.

FIG. 3 illustrates an example CSAT interlacing structure to facilitate inter-operator coordination and co-existence. In this example and in accordance with the example of FIG. 2, the access point 110 and various neighboring access points may operate in accordance with respective CSAT cycles 208 ($T_{CSAT}$) and associated TDM communication patterns 200 within each CSAT cycle 208, and observe a series of AOS periods 210 reserved for access terminal measurements, where CSAT may be effectively disabled. The AOS periods 210 are provided periodically on a recurring basis in accordance with an AOS cycle ($T_{AOS}$) set to balance, for example, the need for access terminal measurements (e.g., for neighbor discovery) against the need for stable co-existence (e.g., with Wi-Fi). As an example, $T_{AOS}$ may be on the order of a few minutes (e.g., 60 seconds, 120 seconds, 180 seconds, 240 seconds, etc.). AOS may be synchronized globally across all operators (e.g., by association with a GPS time or via other mechanisms), with respective CSAT cycles 208 starting at the next subframe after the end of each AOS period 210. As highlighted in the callout box 302, in practice there may be a short time delay between a given AOS period 210 and a given subframe boundary.

As is further illustrated in FIG. 3, periods of enabled CSAT operation 202 may be sub-divided into a plurality of interlaces 304, referred to herein as CSAT Master Cycles (CMCs) and numbered ($CMCN_x$) according to a corresponding index K spanning the number of CMCs between AOS periods 210 (i.e., $CMCN_0$, $CMCN_1$, ..., $CMCN_{K-1}$). The CMC duration ($T_{CMC}$) may be defined so as to encompass all of the allowable CSAT cycle variants that different operators may choose to employ (e.g., as the lowest common multiple) within a common start/stop boundary. For example, in an implementation where the CSAT cycle 208 may be selected from the set of $T_{CSAT}$={10 ms, 20 ms, 50 ms, 100 ms, 200 ms, 400 ms}, the CMC duration may be set to $T_{CMC}$=400 ms.

With such a CSAT interlacing structure in place, the interlace selector 148 may be configured to select a particular one of the interlaces 304 for communication over the medium 132 in accordance with the primary RAT. In general, the interlace 304 selected may be the interlace 304 reserved for the primary RAT operator to which the access point 110 belongs. The primary RAT transceiver 140 may then be configured to cycle, during the selected interlace 304, primary RAT transmission over the medium 132 in accordance with the TDM communication pattern 200, as described above, but to deactivate primary RAT transmission over the medium 132 during other interlaces 304 that are reserved for other primary RAT operators to which the access point 110 does not belong.

Figure 4:
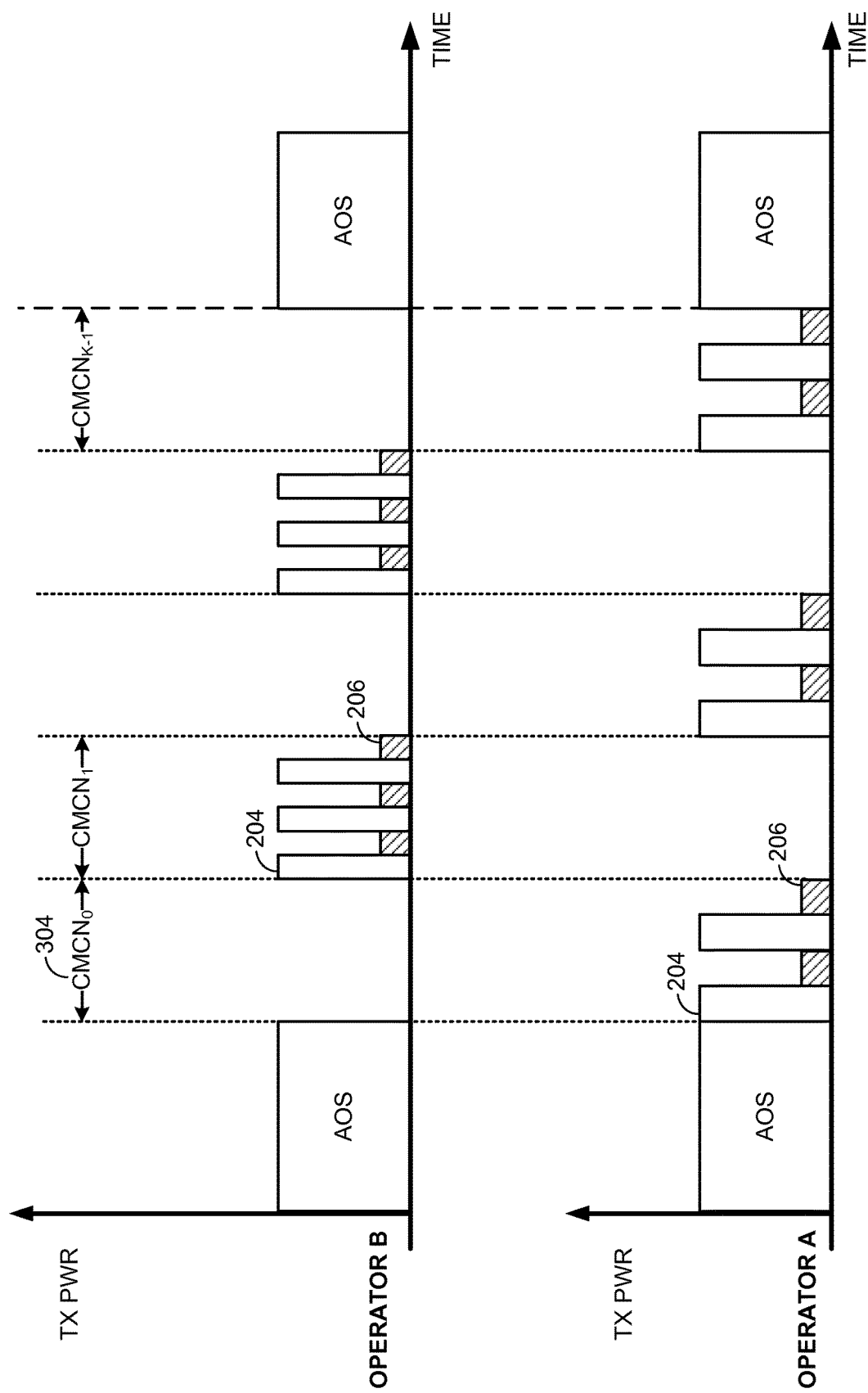
FIG. 4 illustrates a CSAT interlacing structure applied to two example operators.

FIG. 4 illustrates a CSAT interlacing structure applied to two example operators. In this example, a first operator (Operator A) is sharing the medium 132 with a second operator (Operator B). In accordance with the CSAT interlacing structure described above with reference to FIG. 3, the medium 132 is sub-divided in time into different CMC interlaces 304 (i.e., $CMCN_0$, $CMCN_1$, ..., $CMCN_{K-1}$). To facilitate not only better co-existence with other RATs, but also co-existence among themselves, the two operators confine their operation on the medium 132 to respective CMC interlaces 304. In the illustrated example, Operator A utilizes the even-numbered CMC interlaces 304 and Operator B utilizes the odd-numbered CMC interlaces 304, as shown. Within their respective CMC interlaces 304, the operators may perform communication in accordance with their selected CSAT cycling, which may vary from operator to operator, as is further shown.

It will be appreciated that different operators may not exactly align their subframe boundaries with CSAT cycle 208 boundaries, and that in practice the last CSAT cycle 208 in a given CMC interlace 304 may therefore slightly overlap the next CMC interlace 304 of a different operator, but that these overlaps will be relatively small (e.g., on the order of 1 ms or less). Moreover, since any given CSAT interlace 304 ends with a deactivated period 206, and the specified minimum OFF duration ($T_{OFF,\text{min}}$) is typically greater than 1 ms, there will generally be no interference.

The particular CMC interlace 304 that the access point 110 in accordance with its given operator may select or otherwise identify for use may be determined in a number of ways. In general, the interlace selector 148 may be configured to select the CMC interlace 304 dynamically based on a current operating environment. For example, access points associated with different operators may select alternating CMCNs in accordance with an operator ordering, which may be individually inferred and then globally converged upon based on certain Network Listen (NL) scan measurements. As another example, individual CMCNs may be scanned to identify viable options and a transmission pattern may be constructed therefrom. As another example, the ordering may be based on common control channel information advertised between neighboring operator access points.

Figure 5:
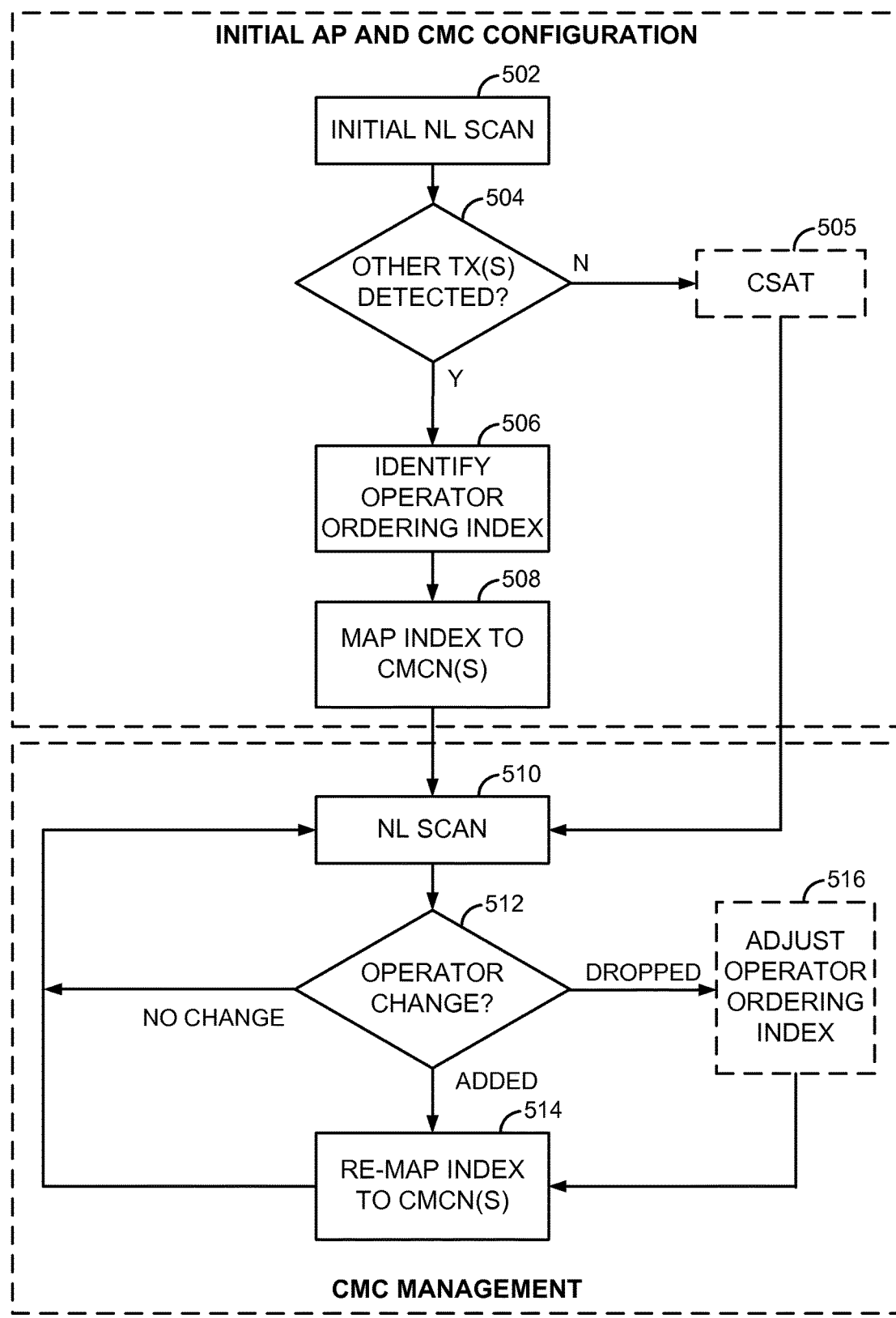
FIG. 5 is a processing flow diagram illustrating an ordering arbitration method for CSAT Master Cycle (CMC) interlace management.

FIG. 5 is a processing flow diagram illustrating an ordering arbitration method for CMC interlace management. The method begins with the access point 110 initializing operation on the medium 132, which may occur upon initial power-up, upon switching channels, etc. In this example, the interlace selector 148 may be configured to select an alternating interlace pattern for the selected interlace in accordance with an operator ordering index.

The access point 110 first performs (e.g., via the primary RAT transceiver 140) an initial NL scan of the medium 132 to identify any operators having at least one neighboring access point that is providing communication on the medium 132 (block 502). As an example, the access point 110 may perform the NL scan for a period of time ($T_{NL}$) during each of a plurality of CMC interlaces 304 to identify any transmissions in its vicinity (e.g., as determined by a corresponding Received Signal Strength Indicator (RSSI) above an $RSSI_{CSAT}$ threshold). For any transmissions that are detected in a given CMC interlace 304, the access point 110 may identify the corresponding operator and record it along with an indication of signal strength (e.g., RSSI). Operator identification in this regard may be determined by decoding a corresponding System Information Block (SIB) field, such as the Public Land Mobile Network (PLMN) ID. If multiple transmissions are detected, it may be sufficient, for example, to record the RSSI of the transmissions but the PLMN ID of one or more of the transmissions.

If no other operators distinct from the access point's 110 own operator are identified in any of the CMC interlaces scanned (e.g., with an RSSI greater than $RSSI_{CSAT}$) ('no' at decision 504), CSAT may be performed without modification (i.e., utilizing all of the available CMCNs) (block 505). However, without loss of generality, (M−1) other operators may be identified ('yes' at decision 504), bringing the total number of operators on the medium 132 to M. The access point 110, representing the new $M^{th}$, operator may then identify a predefined index or the like for its relative position among the (M−1) other operators (block 506) and map that index to one or more corresponding CMCNs of the CMC interlace structure (block 508).

As an example, the index may be a simple integer derived from the total number of operators on the medium 132 when the $M^{th}$ operator access point 110 joins (e.g., with index=M−1, assuming conventional indexing starting with 0). The $M^{th}$ operator access point 110 may then select for its operations the next CMCN of the CMC interlace structure after the (M−1) other operators (i.e., CMCN=nM 30 (M−1), where n=0, 1, 2, etc., through the remainder of the CSAT enabled period 202). The (M−1) other operators may adjust their selected CMCNs accordingly (as discussed in more detail below).

As another example, the index may be derived from system information such as each operator's PLMN ID. The PLMN ID or some other related operator ID may be mapped (e.g., in ascending order) to the index.

Returning to FIG. 5, following initial access point and CMC configuration, the access point 110 may perform continuous or periodic CMC management functions to ensure accurate CMC interlace selection in accordance with its current operating environment (e.g., as other operators enter or exit operation in its neighborhood).

More specifically, the access point 110 may monitor the medium 132 by performing additional (periodic or event-driven) NL scanning (block 510) to identify the current number of other operators having at least one neighboring access point providing communication on the medium 132 (e.g., as determined by a corresponding RSSI above an $RSSI_{CSAT}$ threshold). If no change in neighboring operators is detected ('no change' at decision 512), the access point 110 may return to NL scanning at a later time (e.g., in accordance with a periodic timer or some other trigger).

If, however, a new operator is detected ('added' at decision 512), such as via the initializing procedures described above, the access point 110 may take further steps to re-map its index to one or more corresponding CMCNs of the CMC interlace structure (block 514) in light of the now larger number of operators sharing the medium 132. Returning to the example above, and without loss of generality, the first (M−1) operators using the medium 132 may detect the new $M^{th}$ operator in their next NL scan. The $i^{th}$ operator among the first (M−1) operators may then re-evaluate the correspondence of its index, among the now larger set of indices, to the CMCNs, and start using the next associated CMCN (i.e., CMCN=nM+i, where again n=0, 1, 2, etc., through the remainder of the CSAT enabled period 202). Here, the $i^{th}$ operator is defined to be the $i^{th}$ operator that starts using the medium 132 while (i−1) operators within (e.g., $RSSI_{CSAT}$) range are already using the medium 132.

Returning again to FIG. 5, if, on the other hand, it is detected that an operator is no longer sharing the medium 132 ('dropped' at decision 512), the access point 110 may take further steps to first adjust its index (block 516) (if necessary) and then re-map its index to one or more corresponding CMCNs of the CMC interlace structure (block 514) in light of the now smaller number of operators sharing the medium 132. The adjustment step (block 516) in FIG. 5 is shown as optional because while certain operators may need to adjust their indices (e.g., those with a higher index than the operator vacating the medium 132), other operators may not (e.g., those with a lower index than the operator vacating the medium 132).

Returning again to the example above, and without loss of generality, it may be determined that the $k^{th}$ operator has stopped using the medium 132, with the $k^{th}$ operator originally being in interlaced CSAT co-existence with the other (M−1) operators (for example, the other (M−1) operators may discover through NL scanning that operator k does not have an access point within an $RSSI_{CSAT}$ range). For a given operator with index q, if q falls below the index k of the operator vacating the medium 132 (i.e., if q=0, 1, . . . , k−1), no adjustment to index q is necessary and the operator may simply re-evaluate the correspondence of its index, among the now smaller set of indices, to the CMCNs, and start using the next associated CMCN (i.e., CMCN=n(M−1)+q, where again n=0, 1, 2, etc., through the remainder of the CSAT enabled period 202). If, however, q falls above the index k of the operator vacating the medium 132 (i.e., if q=k+1 ... M−1), the operator may decrement its index (i.e., q'=q−1). The operator may then determine the correspondence of its new index q', among the now smaller set of indices, to the CMCNs, and start using the next associated CMCN (i.e., CMCN=n(M−1)+q', where again n=0, 1, 2, etc., through the remainder of the CSAT enabled period). As another example, the reordering of the index q or q' may be based on a PLMN ID mapping to some order (e.g., in ascending order), and so on.

Because of the dynamic and largely unplanned nature of access point deployment, in certain scenarios, the access point 110 may determine that it is on the boundary of two otherwise separate operators or clusters of operators that are not interlacing with each other. In this case, it may be advantageous to perform special transmission pattern processing, including transmission pattern discovery and transmission power management. The transmission pattern may be effectively "ad hoc" in the sense that it need not be evenly distributed across the CMCNs.

Figure 6:
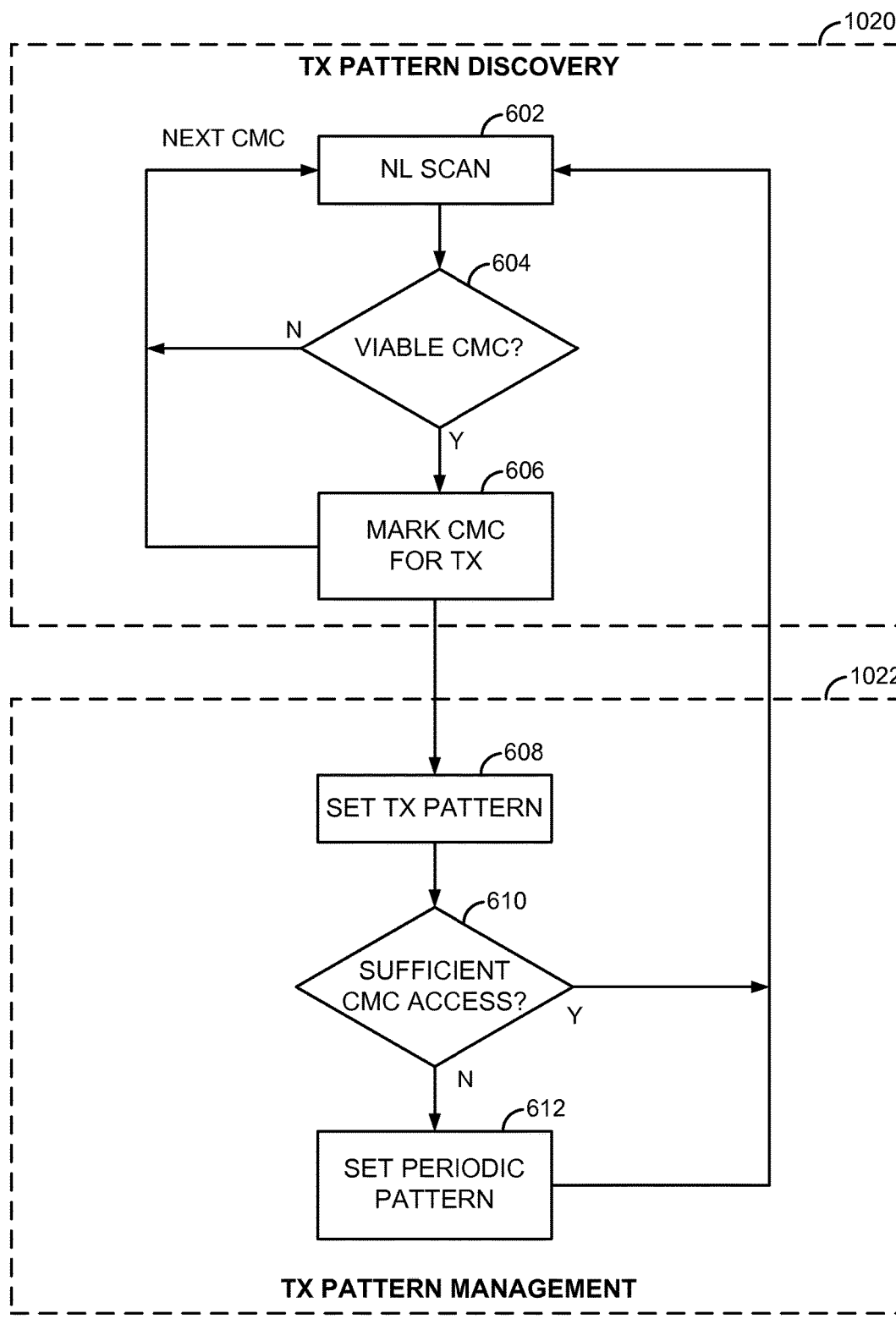
FIG. 6 is a processing flow diagram illustrating transmission pattern processing in more detail.

FIG. 6 is a processing flow diagram illustrating transmission pattern processing in more detail. As shown, the access point 110 continues to monitor via NL scanning (block 602) a plurality of CMC interlaces to identify viable CMCNs where the access point 110 may safely operate. For example, for a given CMC interlace, if no transmissions are found within range (e.g., with RSRP less than a threshold) or the PLMN ID of all detected transmissions belongs to the same operator as the access point 110 ('yes' at decision 604), the access point 110 may mark that CMC interlace for transmission (block 606). Otherwise ('no' at decision 604), the CMC interlace is not marked for transmission. In either case, the next CMC interlace is processed in a similar fashion until a sufficient number of training CMC interlaces is reached.

Once a sufficient number of training CMC interlaces have been processed, a transmission pattern for the access point 110 may be set based on the CMC interlaces marked as viable (block 608). That is, the access point 110 may construct for itself a transmission pattern for transmitting on the medium 132 (utilizing CSAT operation) that corresponds to the CMCNs of all the CMC interlaces marked as viable. It will be appreciated that the access point 110 need not wait until the transmission pattern is fully constructed per se, but may transmit in any given CMC interlace once identified as viable, even during the training phase to increase efficiency.

In some scenarios, however, the number of CMC interlaces marked as viable in this way may be too low for adequate operation (e.g., if the access point 110 is operating on the edge of two other operators that are each employing the entire CMC interlace structure). Accordingly, the access point 110 may additionally check the transmission pattern to ensure that the transmission pattern will provide sufficient medium access (decision 610). For example, the access point 110 may compare the fraction of CMC interlaces identified as viable in the transmission pattern against a baseline fairness metric derived from the number of operators identified as co-existing on the medium 132 (e.g., metric=1/(P+1), where P is the number of PLMN IDs discovered above an $RSSI_{CSAT}$ threshold).

If the access point 110 determines that the transmission pattern derived from the CMC interlaces marked as viable will provide sufficient CMC interlace access (e.g., if the fraction of CMC interlaces marked as viable is greater than 1/(P+1)) ('yes' at decision 610), the transmission pattern may be retained and operation continued.

Otherwise, if the access point 110 determines that the transmission pattern derived from the CMC interlaces marked as viable will not provide sufficient CMC access (e.g., if the fraction of CMC interlaces marked as viable is less than 1/(P+1)) ('no' at decision 610), the access point 110 may generate an alternative periodic pattern (block 612). Returning to the example above, the periodic pattern may ensure that the access point 110 is afforded a CMC interlace once every (P+1) CMC interlaces. Other operators may similarly discover the new operator and adjust their patterns accordingly, which will result in convergence among the operators.

In addition or as an alternative to inferential interlacing and pattern discovery, one or more inter-operator co-existence advertisement messages may be defined to convey information between access points of different operators.

Figure 7:
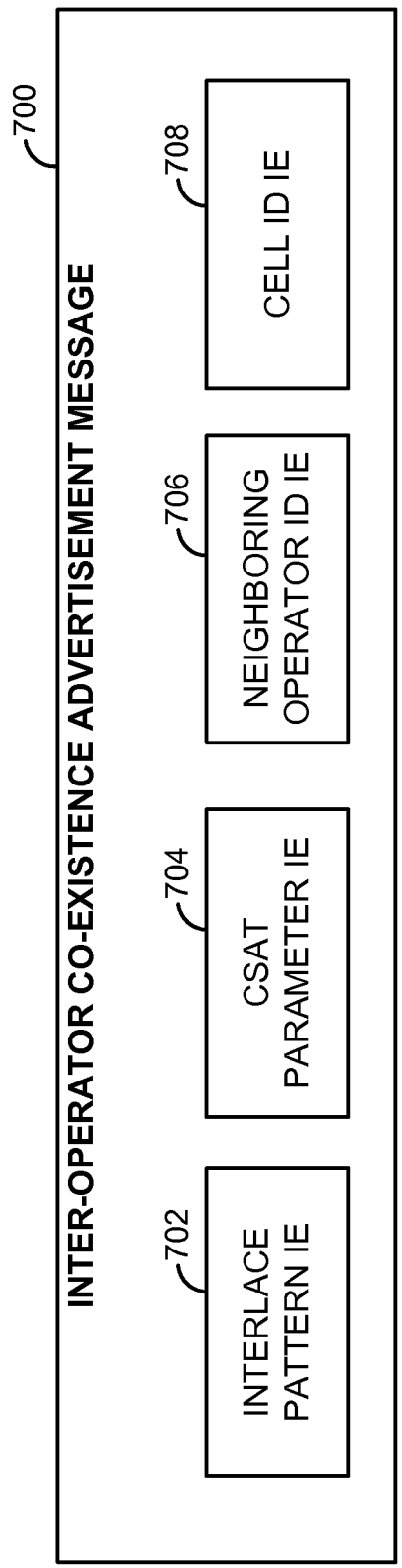
FIG. 7 illustrates an example inter-operator co-existence advertisement message that may be broadcast or otherwise exchanged between neighboring access points.

FIG. 7 illustrates an example inter-operator co-existence advertisement message that may be broadcast or otherwise exchanged between neighboring access points. In general, the inter-operator co-existence advertisement message 700 may include different information elements (IEs) to convey different types of information that may be useful in coordinating co-existence parameters among the neighboring access points.

In the illustrated example, the inter-operator co-existence advertisement message 700 includes an Interlace Pattern IE 702, a CSAT Parameter IE 704, a Neighboring Operator ID IE 706, and a Cell ID IE 708. The Interlace Pattern IE 702 may convey information about the access point's 110 utilization of the CMC interlace structure (e.g., its operating CMCNs). The CSAT Parameter IE 704 may convey information about the access point's 110 CSAT cycle (e.g., $T_{CSAT}$). The Neighboring Operator ID IE 706 may convey information about the other operators that are visible to the access point 110 (e.g., PLMN(s)). The Cell ID IE 708 may convey an identity of the access point 110 itself (e.g., Physical Cell ID (PCI)).

The inter-operator co-existence advertisement message 700 may be exchanged between neighboring access points via common control channels among the multiple operators, such as SIBs, common Multicast-Broadcast Single-Frequency Network (MBSFN) subframes, etc.

In addition, based on reports from the access terminal 120 (e.g., Call Quality Indicator (CQI), Reference Signal Received Power (RSRP), or SIB1 reports), the access point 110 may identify whether the access terminal 120 is experiencing interference from other operators and take remedial action, such as requesting that the aggressor operator and associated base station enter into CSAT operation to avoid interference.

Figure 8:
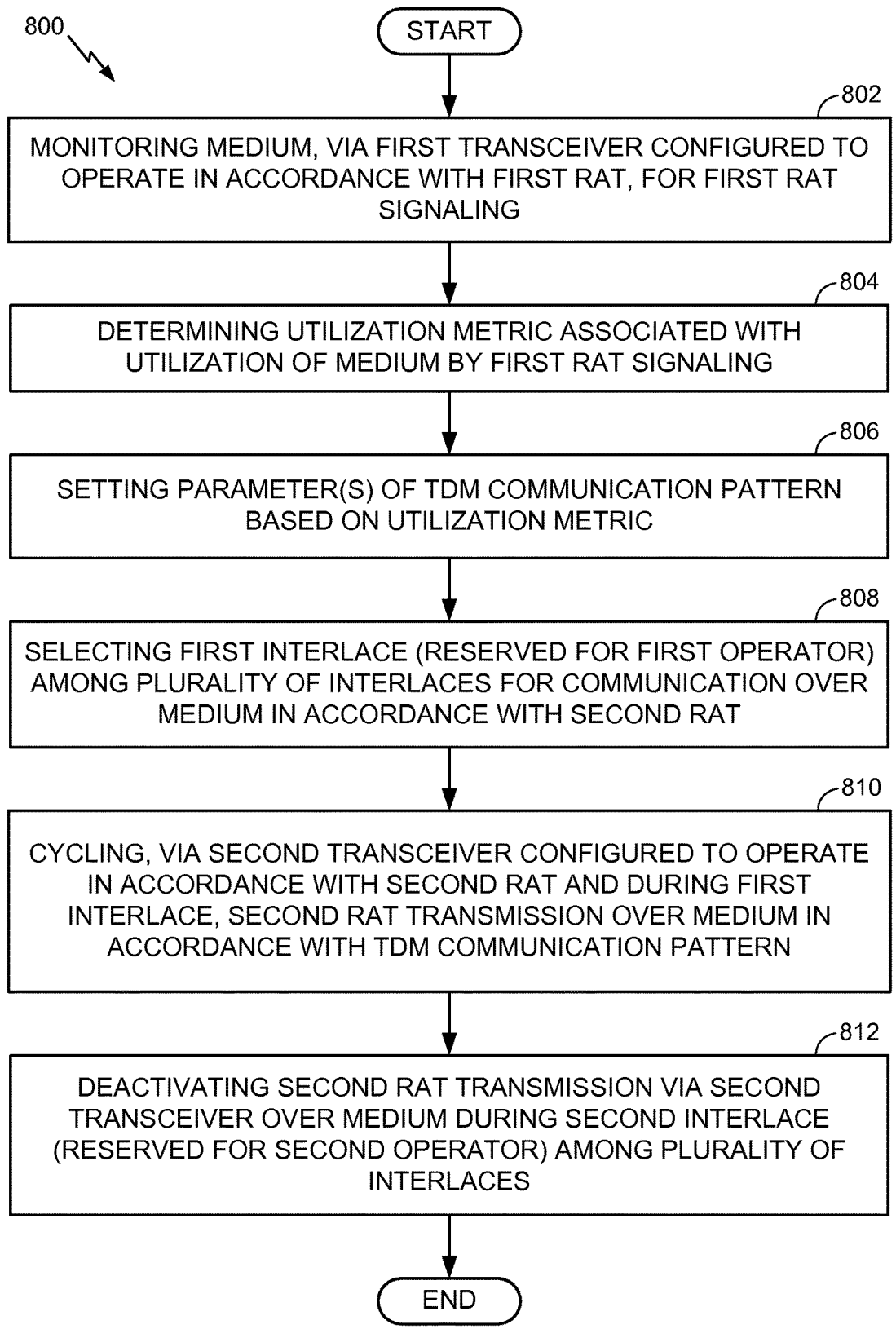
FIG. 8 is a flow diagram illustrating an example method of managing operation on a communication medium shared between Radio Access Technologies (RATs).

FIG. 8 is a flow diagram illustrating an example method for managing operation on a communication medium shared between RATs in accordance with the techniques described above. As a particular example, the medium may include one or more time, frequency, or space resources on an unlicensed radio frequency band shared between LTE technology and Wi-Fi technology devices. The method 800 may be performed, for example, by an access point (e.g., the access point 110 illustrated in FIG. 1).

As shown, the access point may monitor (block 802) the medium, via a first transceiver configured to operate in accordance with a first RAT, for first RAT signaling. The monitoring may be performed, for example, by a transceiver such as the secondary RAT transceiver 142 or the like. The access point may then determine (block 804) a utilization metric associated with utilization of the medium by the first RAT signaling. The determining may be performed, for example, by a medium utilization analyzer such as the medium utilization analyzer 144 or the like. Based on the utilization metric, the access point may set (block 806) one or more parameters of a TDM communication pattern, with the TDM communication pattern defining activated periods and deactivated periods for communication over the medium in accordance with a second RAT. The setting may be performed, for example, by an operating mode controller such as the operating mode controller 146 or the like. The access point may select (block 808) a first interlace among a plurality of interlaces for communication over the medium in accordance with the second RAT, with the first interlace being reserved for a first operator of the second RAT. The selecting may be performed by an interlace selector such as the interlace selector 148 or the like. The access point may then cycle (block 810), via a second transceiver configured to operate in accordance with the second RAT and during the first interlace, second RAT transmission over the medium in accordance with the TDM communication pattern, and deactivate (block 812) second RAT transmission via the second transceiver over the medium during a second interlace among the plurality of interlaces that is reserved for a second operator of the second RAT. The cycling and deactivating may be performed, for example, by another transceiver such as the primary RAT transceiver 140 or the like.

As discussed in more detail above, the first and second operators may correspond to respective entities that manage respective networks, for example, with each network being composed of multiple access points. In general, the selecting (block 808) may include selecting the first interlace dynamically based on a current operating environment.

As an example, the selecting (block 808) may include selecting an alternating interlace pattern for the first interlace among the plurality of interlaces in accordance with an operator ordering index. The operator ordering index may be determined, for example, by monitoring the medium for the number of operators having a signal strength above a threshold, or by decoding a SIB field representing an operator-specific identifier. Exit of the second operator or entry of a third operator may also be monitored, and the alternating interlace pattern adjusted based on the exit or entry.

As another example, the selecting (block 808) may include constructing an ad hoc transmission pattern encompassing at least the first interlace based on second RAT signaling in each of the plurality of interlaces. For example, the medium may be monitored during the first interlace for second RAT signaling associated with an operator other than the first operator, and the first interlace may be marked for the transmission pattern based on an absence of monitored signaling above a threshold.

As another example, the selecting (block 808) may include selecting the first interlace among the plurality of interlaces based on control channel information received from a neighboring access point. The control channel information may include at least one of an interlace pattern parameter, a TDM cycling parameter, a neighboring operator identifier parameter, a cell identifier parameter, or a combination thereof For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

FIG. 12 provides alternative illustrations of apparatuses for implementing the access point 110 and/or the access terminal 120 represented as a series of interrelated functional modules.

Figure 9:
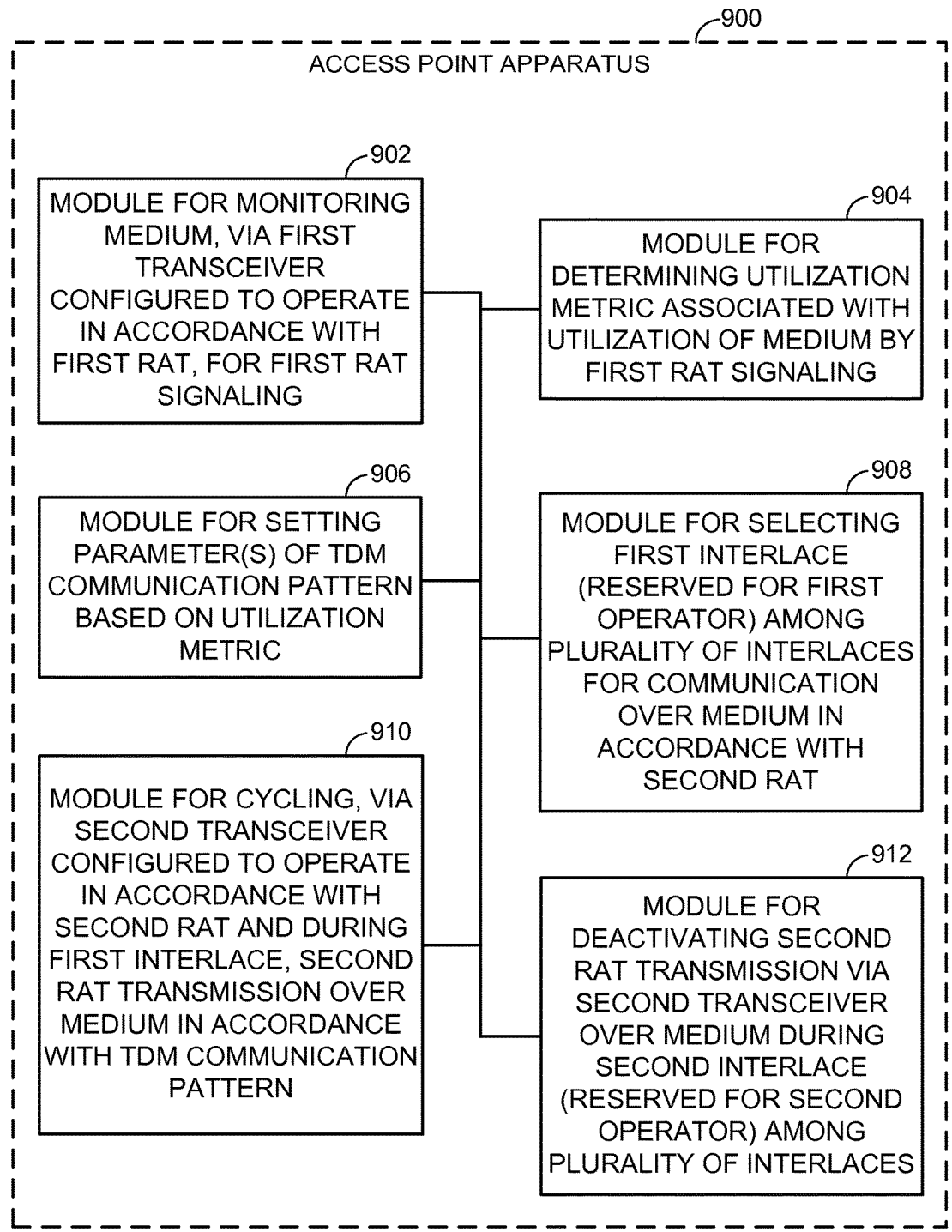
FIG. 9 illustrates an example access point apparatus represented as a series of interrelated functional modules.

FIG. 9 illustrates an example access point apparatus 900 represented as a series of interrelated functional modules. A module for monitoring 902 may correspond at least in some aspects to, for example, a communication device or a component thereof as discussed herein (e.g., the communication device 112 or the like). A module for determining 904 may correspond at least in some aspects to, for example, a communication controller or a component thereof as discussed herein (e.g., the communication controller 114 or the like). A module for setting 906 may correspond at least in some aspects to, for example, a communication controller or a component thereof as discussed herein (e.g., the communication controller 114 or the like). A module for selecting 908 may correspond at least in some aspects to, for example, a communication controller or a component thereof as discussed herein (e.g., the communication controller 114 or the like). A module for cycling 910 may correspond at least in some aspects to, for example, a communication device or a component thereof as discussed herein (e.g., the communication device 112 or the like). A module for deactivating 912 may correspond at least in some aspects to, for example, a communication device or a component thereof as discussed herein (e.g., the communication device 112 or the like).

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for managing operation on a communication medium (132) shared between RATs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus for managing operation on a communication medium shared between Radio Access Technologies (RATs), comprising:
    a first transceiver configured to operate in accordance with a first RAT and to monitor the communication medium for first RAT signaling;
    at least one processor;
    at least one memory coupled to the at least one processor, the at least one processor and the at least one memory being configured to:
        determine a utilization metric associated with utilization of the communication medium by the first RAT signaling,
        set one or more parameters of a Time Division Multiplexing (TDM) communication pattern based on the utilization metric, the TDM communication pattern defining activated periods and deactivated periods for communication over the communication medium in accordance with a second RAT, and
        select a first interlace among a plurality of interlaces for communication over the communication medium in accordance with the second RAT, the first interlace being reserved for a first operator of the second RAT; and
    a second transceiver configured to operate in accordance with the second RAT and to cycle, during the first interlace, second RAT transmission over the communication medium in accordance with the TDM communication pattern, and to deactivate second RAT transmission over the communication medium during a second interlace among the plurality of interlaces that is reserved for a second operator of the second RAT.

2. The apparatus of claim 1, wherein the first and second operators correspond to respective entities that manage respective networks, each network being composed of multiple access points.

3. The apparatus of claim 1, wherein the at least one processor and the at least one memory are configured to select the first interlace dynamically based on a current operating environment of the apparatus.

4. The apparatus of claim 1, wherein the at least one processor and the at least one memory are configured to select an alternating interlace pattern for the first interlace among the plurality of interlaces in accordance with an operator ordering index.

5. The apparatus of claim 4, wherein the at least one processor and the at least one memory are further configured to determine the operator ordering index by monitoring the communication medium for the number of operators having a signal strength above a threshold.

6. The apparatus of claim 4, wherein the at least one processor and the at least one memory are further configured to determine the operator ordering index by decoding a System Information Block (SIB) field representing an operator-specific identifier.

7. The apparatus of claim 4, wherein the at least one processor and the at least one memory are further configured to monitor the communication medium for exit of the second operator or entry of a third operator, and to adjust the alternating interlace pattern based on the exit or entry.

8. The apparatus of claim 1, wherein the at least one processor and the at least one memory are configured to construct an ad hoc transmission pattern encompassing at least the first interlace based on second RAT signaling in each of the plurality of interlaces.

9. The apparatus of claim 8, wherein the second transceiver is further configured to monitor the communication medium during the first interlace for second RAT signaling associated with an operator other than the first operator, and the at least one processor and the at least one memory are further configured to mark the first interlace for the transmission pattern based on an absence of monitored signaling above a threshold.

10. The apparatus of claim 1, wherein the at least one processor and the at least one memory are configured to select the first interlace among the plurality of interlaces based on control channel information received from a neighboring access point.

11. The apparatus of claim 10, wherein the control channel information includes at least one of an interlace pattern parameter, a TDM cycling parameter, a neighboring operator identifier parameter, a cell identifier parameter, or a combination thereof.

12. The apparatus of claim 1, wherein:
the communication medium comprises one or more of time, frequency, or space resources on an unlicensed radio frequency band;
the first RAT comprises Wi-Fi technology; and
the second RAT comprises Long Term Evolution (LTE) technology.

13. A method for managing operation on a communication medium shared between Radio Access Technologies (RATs), comprising:
monitoring the communication medium, via a first transceiver configured to operate in accordance with a first RAT, for first RAT signaling;
determining a utilization metric associated with utilization of the communication medium by the first RAT signaling;
setting one or more parameters of a Time Division Multiplexing (TDM) communication pattern based on the utilization metric, the TDM communication pattern defining activated periods and deactivated periods for communication over the communication medium in accordance with a second RAT;
selecting a first interlace among a plurality of interlaces for communication over the communication medium in accordance with the second RAT, the first interlace being reserved for a first operator of the second RAT;
cycling, via a second transceiver configured to operate in accordance with the second RAT and during the first interlace, second RAT transmission over the communication medium in accordance with the TDM communication pattern; and
deactivating second RAT transmission via the second transceiver over the communication medium during a second interlace among the plurality of interlaces that is reserved for a second operator of the second RAT.

14. The method of claim 13, wherein the first and second operators correspond to respective entities that manage respective networks, each network being composed of multiple access points.

15. The method of claim 13, wherein the selecting comprises selecting the first interlace dynamically based on a current operating environment.

16. The method of claim 13, wherein the selecting comprises selecting an alternating interlace pattern for the first interlace among the plurality of interlaces in accordance with an operator ordering index.

17. The method of claim 13, wherein the selecting comprises constructing an ad hoc transmission pattern encompassing at least the first interlace based on second RAT signaling in each of the plurality of interlaces.

18. The method of claim 13, wherein the selecting comprises selecting the first interlace among the plurality of interlaces based on control channel information received from a neighboring access point.

19. The method of claim 13, wherein:
the communication medium comprises one or more time, frequency, or space resources on an unlicensed radio frequency band;
the first RAT comprises Wi-Fi technology; and
the second RAT comprises Long Term Evolution (LTE) technology.

20. An apparatus for managing operation on a communication medium shared between Radio Access Technologies (RATs), comprising:
means for monitoring the communication medium, in accordance with a first RAT, for first RAT signaling;
means for determining a utilization metric associated with utilization of the communication medium by the first RAT signaling;
means for setting one or more parameters of a Time Division Multiplexing (TDM) communication pattern based on the utilization metric, the TDM communication pattern defining activated periods and deactivated periods for communication over the communication medium in accordance with a second RAT;
means for selecting a first interlace among a plurality of interlaces for communication over the communication medium in accordance with the second RAT, the first interlace being reserved for a first operator of the second RAT;
means for cycling, via a second transceiver configured to operate in accordance with the second RAT and during the first interlace, second RAT transmission over the communication medium in accordance with the TDM communication pattern; and
means for deactivating second RAT transmission in accordance with the second RAT over the communication medium during a second interlace among the plurality of interlaces that is reserved for a second operator of the second RAT.

* * * * *